April 5, 1949.                    C. LOCKE                    2,466,453
APPARATUS FOR TESTING FOUNDRY SAND
Filed July 5, 1947                                        2 Sheets-Sheet 2

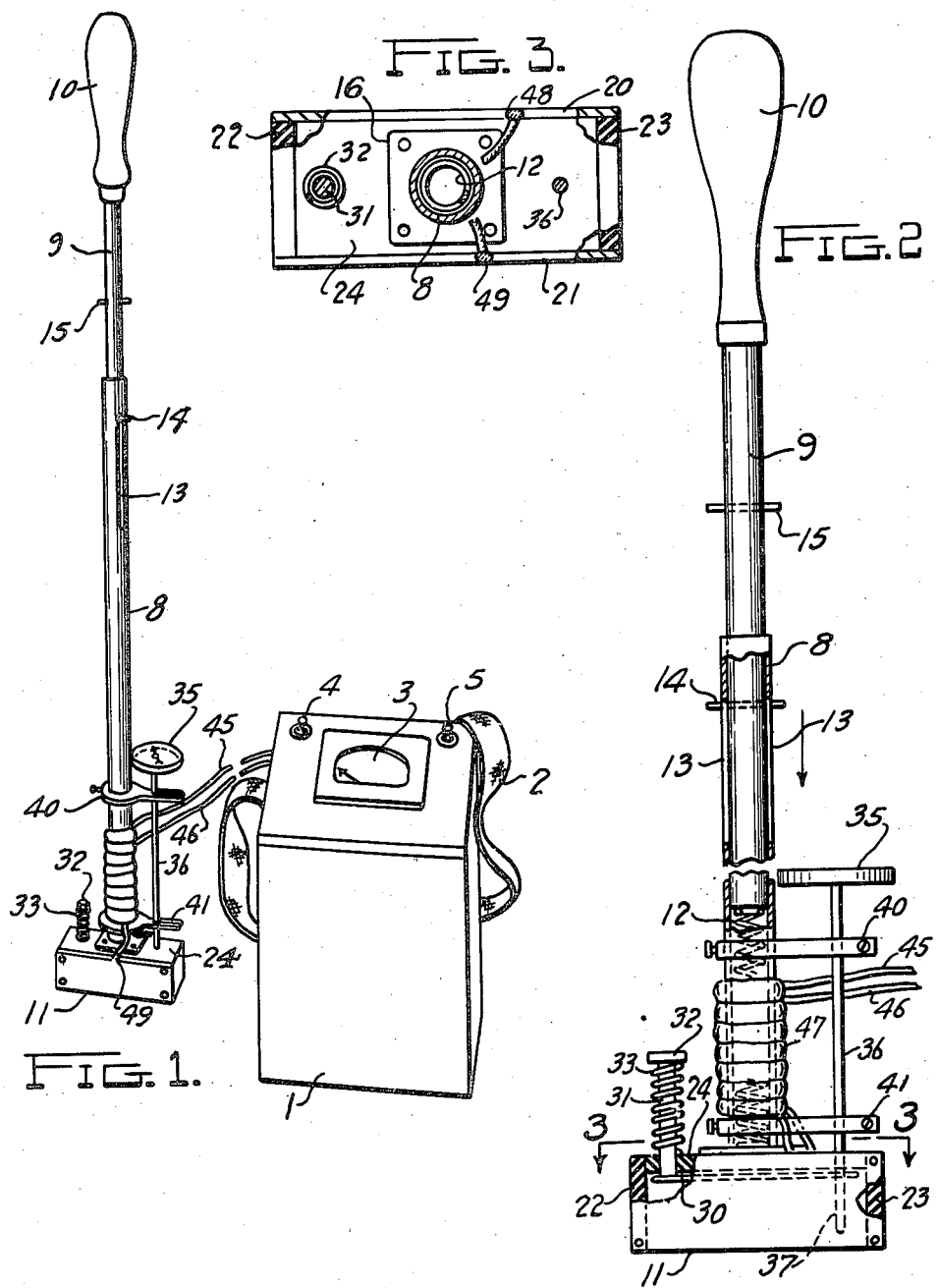

INVENTOR.
Charles Locke
BY
Barnes Kisselle, Laughlin & Raisch
ATTORNEYS

Patented Apr. 5, 1949

2,466,453

UNITED STATES PATENT OFFICE 2,466,453

APPARATUS FOR TESTING FOUNDRY SAND

Charles Locke, Muskegon Heights, Mich., assignor to West Michigan Steel Foundry Company, Muskegon, Mich., a corporation of Michigan Application July 5, 1947, Serial No. 759,121

1 Claim. (Cl. 175—183)

This invention relates to the art of founding and it has to do particularly with the provisions of an improved method and instrument for ascertaining the moisture content in the sand mixture used for forming molds, cores or the like.

There has been a long felt need for some kind of an instrument or method, particularly of a portable nature, for quickly and accurately determining the moisture content of a sand mixture but several methods and devices which have heretofore been tried have not met the requirements. There are a number of variations which enter into the matter of ascertaining moisture content, including the sand mixture ingredients other than water, the density of the test sample, the size of the test sample, and the temperature of the test sample. The present invention aims to provide an improved device for measuring the moisture content by finding the electrical conductivity of the test sample and this introduces another variable, namely, the applied voltage.

The general object of the invention is to provide a device which places the test sample in an electrical circuit and wherein the measured amperage through the test sample is dependent upon the moisture content and independent of other variables and particularly such variables as the density of sample, the size of the test sample, the temperature of the test sample and the applied voltage.

A further object of the invention is to provide a portable instrument of a rugged nature capable of ease of operation and by the use of which moisture content of a sand mixture can be ascertained on the job.

A device for carrying out the invention is disclosed in the accompanying drawings wherein:

Fig. 1 is a general view of a perspective nature showing the testing instrument and its accompanying portable power box.

Fig. 2 is an enlarged view largely in cross section showing structural features of the instrument.

Fig. 3 is a view taken on line 3—3 of Fig. 2 with parts cut away to show the test sample box construction.

Figure 4:
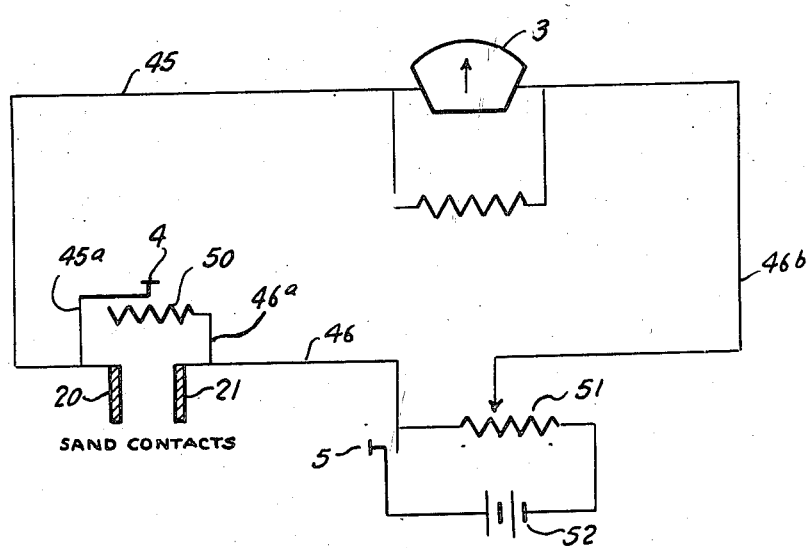
Fig. 4 is a diagrammatic view of the electrical wiring diagram.

As illustrated in Fig. 1, there is a container or box 1 for suitable dry cells, equipped with a strap 2 which may be slung over the shoulder of an operator. This box is provided with the reading instrument which specifically is an ammeter 3 and two conveniently located switches 4 and 5 are shown which control the electric circuit later to be described.

The tool or instrument itself has a handle structure which includes two telescoping elements, one of which is a tube 8 and the other of which is a rod 9, provided with a handle 10. The tube 8 is provided with a flange at its lower end, as shown at 16, and which is secured to a box or container generally shown at 11. Disposed within the tube 8 is a coil spring 12. Its lower end may rest upon the flange 16 and its upper end engages the rod 9. The tube 8 is provided with oppositely disposed slots 13 in which rides a cross pin 14 which passes through the rod 9. The spring normally urges the rod upwardly as Fig. 2 is viewed until the pin 14 strikes the ends of the slots 13. A second cross pin 15 is carried by the rod 9 in a position above the end of the tube 8. It will be appreciated that if the rod 9 is pushed downwardly, the spring 12 is compressed and that the limit of compression is reached when the cross pin 15 strikes the end of the tube 8.

The sample box comprises sand contacts in the form of side plates 20 and 21, which may be made of suitable conducting material, such as brass or the like, and the box structure is completed by end walls 22 and 23 and a top wall 24 of non-conducting material, such as a suitable form of plastic preferably a thermo-setting substance.

The underside of the box is open. A test specimen ejecter is preferably included, this being a plate 30 which loosely fits within the box and which carries a plunger 31 which extends upwardly through the top wall of the box and which is provided with a head 32 acted upon by a coil spring 33. The spring normally holds the ejecter plate 30 against the underside of the wall 24.

A suitable thermometer, advantageously of the dial-type, is shown at 35, having a downwardly extending feeler leg 36 which projects through the top of the box and slidably through the plate 30 so that the lower end of the feeler, as shown at 37, is positioned well down in the box 11. This thermometer is suitably mounted as by means of clamps 40 and 41 bound to the tube 8. Conductor wires, as shown at 45 and 46, extend from the power box 1 and may be wrapped about the tube 8, as shown at 47, and these cables connect respectively to the two plates 20 and 21 as shown at 48 and 49. A known resistance 50 is arranged to be shunted across the contact plates 20 and 21, the resistance being connected into the contact plate circuit by the conductors 45a and 46a and controlled by the switch 4. A variable resistance 51 is disposed in the circuit of a battery 52, the circuit being completed by the conductor wire 46b and this main circuit is controlled by the switch 5. It will be understood that the battery, the variable resistance 51, the resistance 50, the switches 4 and 5, and the ammeter 3, are all mounted in the box 1.

In calibrating or standarizing the instrument prior to use, the main switch 5 is closed and the switch 4 is closed which substitutes the known resistance 50 for the sand sample to be engaged between the contact plates 20 and 21. The variable resistance 51 is now adjusted in order to provide a chosen-scale deflection of the needle of the ammeter 3. Thus, prior to test, the instrument is standardized to insure a known and required voltage to which the test sample is to be subjected.

In using the instrument the operator grasps the handle 10 and pushes the box 11, which is open on its underside, into the sand mixture in a container and pressure is applied, and the spring 12 compressed until the cross pin 15 seats against the tube 8. Thus the cross pin is a gauging means as it indicates or gauges the pressure applied. At this time the pressure is discontinued and the instrument is withdrawn from the bin containing the sand mixture. In this way, the test sample is determined as to its density because of its being subjected to a definite pressure; the size of the sample is determined and the temperature is given by the thermometer. It is assumed of course, that the operator is familiar with the ingredients other than water in the sand mixture. The switch 5 is now closed to subject the test sample to the applied voltage and the amperage which may be read by the deflection of the needle of the ammeter 3 is dependent upon the moisture content of the sand mixture and substantially independent of the variables mentioned above.

Figure 5:
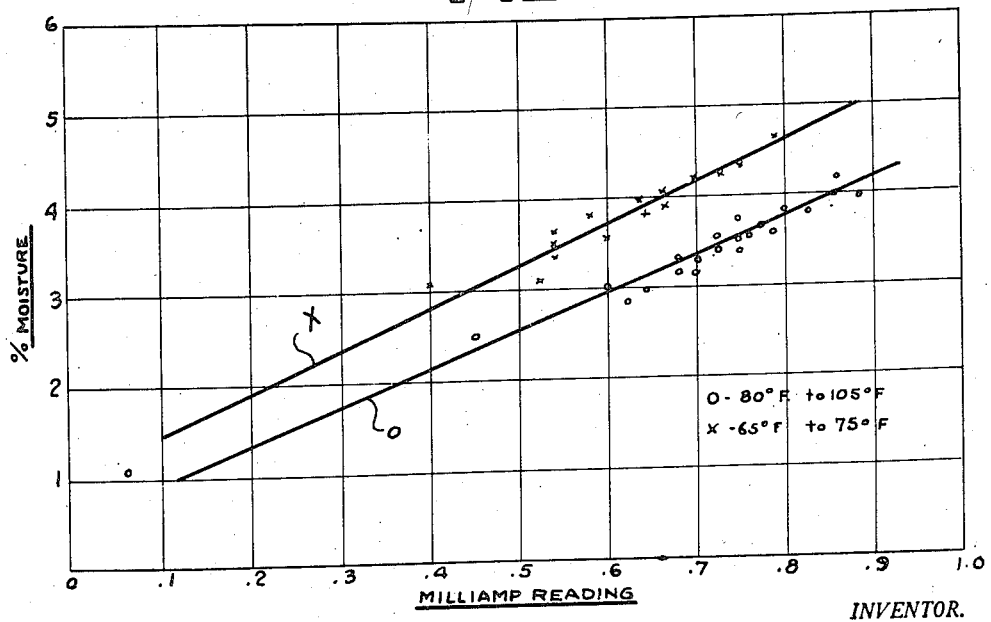
Fig. 5 is a chart showing working curves for a given sand mixture.

The chart indicated in Fig. 5 shows two curves for a given type of sand mixture, the chart showing only a few representative points which were made in order to calibrate the instrument to the sand. The curve O is representative of the milliamp reading for the given sand mix with the sand mix at a temperature between 80° F. and 105° F. The curve x indicates the milliamp readings of the same mix where the temperature of the same sand mix was from 65° F. to 75° F. Accordingly, for example, if the reading on the ammeter is .6 milliamp with the temperature of the sand between 80° F. and 105° F., the moisture content of the sand is 3%. If the milliamp reading is .6 with the sand mix at a temperature of 65° to 75°, the moisture content is about 3.75%. Accordingly, it will be appreciated that having established the milliamp reading with a known temperature of the sand mix, the reading can be easily checked with the charts such, as shown in Fig. 5, to ascertain the moisture content. After the sample has been tested, it may be ejected from the box by depressing the plunger 31 thus causing the plate 30 to push the test sample out of the box.

I claim:

A portable instrument for determining the moisture content of a mixture such as a sand mixture for founding, which comprises a receptacle open at one side and having side walls and a back wall, a handle part secured to the back wall, a second handle part slidably arranged with respect to the first mentioned handle part, spring means reacting against the handle parts, the receptacle adapted to be projected into a body of the mixture by manipulation of the second handle part and pressed into the mixture with resultant flexing of the spring means, means for limiting the flexing of the spring means, whereby a determined density of the mixture is obtained in the receptacle, two opposite side walls of the receptacle being of electric conducing material and constituting electrodes, a thermometer with a sensitive portion position in the receptacle for ascertaining the temperature of the mixture in the receptacle, a container for electrical storage battery means having means by which it may be carried by an operator, flexible conductors extending from the container to said electrodes, a circuit controlling switch on the container and an ammeter on the container for indicating the flow of electrical current through the mixture in the receptacle.

CHARLES LOCKE.

REFERENCES CITED

The following references are of record in the file of this patent:

UNITED STATES PATENTS

| Number | Name | Date |
| --- | --- | --- |
| 1,610,563 | McIlvanie | Dec. 14, 1926 |
| 1,826,247 | Heppenstall | Oct. 6, 1931 |
| 2,063,840 | Fairchild et al. | Dec. 8, 1936 |
| 2,251,641 | Stein | Aug. 5, 1941 |